United States Patent [19]
Gold

[11] Patent Number: 5,765,310
[45] Date of Patent: Jun. 16, 1998

[54] FRANGIBLE VEHICLE WINDOW PANEL MOUNTING BRACKET

[76] Inventor: Peter N. Gold, 465 N. Wood Rd., Rockville Centre, N.Y. 11570

[21] Appl. No.: 722,422

[22] Filed: Oct. 1, 1996

[51] Int. Cl.$^6$ .................................................. B60J 1/16
[52] U.S. Cl. .................................................. 49/375
[58] Field of Search ............................ 49/374, 375, 502

[56] References Cited

U.S. PATENT DOCUMENTS

| | | | |
|---|---|---|---|
| 2,822,215 | 2/1958 | Blanton et al. | 49/375 X |
| 3,050,332 | 8/1962 | Arnold | 49/375 X |
| 4,449,326 | 5/1984 | Hori et al. | 49/375 |
| 4,776,132 | 10/1988 | Gold | 49/375 |
| 4,949,509 | 8/1990 | Gold | 49/375 X |
| 4,987,699 | 1/1991 | Gold | 49/375 |

*Primary Examiner*—Jerry Redman
*Attorney, Agent, or Firm*—Galgano & Burke

[57] ABSTRACT

A frangible window panel mounting system for mounting an automotive window panel onto a window regulating mechanism for raising and lowering the window panel of a vehicle includes a U-shaped spring clip and a mounting flange for attaching the window panel to the window regulating mechanism. The U-shaped spring clip has a horizontal base member and first and second leg members extending upwardly from the base member, thereby forming a U-shaped channel for receiving a bottom edge of a window panel. The mounting flange is downwardly depending from, and coupled to the horizontal base member of the spring clip. The mounting flange is frangible so as to allow the spring clip to detach from a window regulating mechanism upon a side impact of the vehicle to thereby minimize the likelihood that the window panel will shatter.

17 Claims, 3 Drawing Sheets

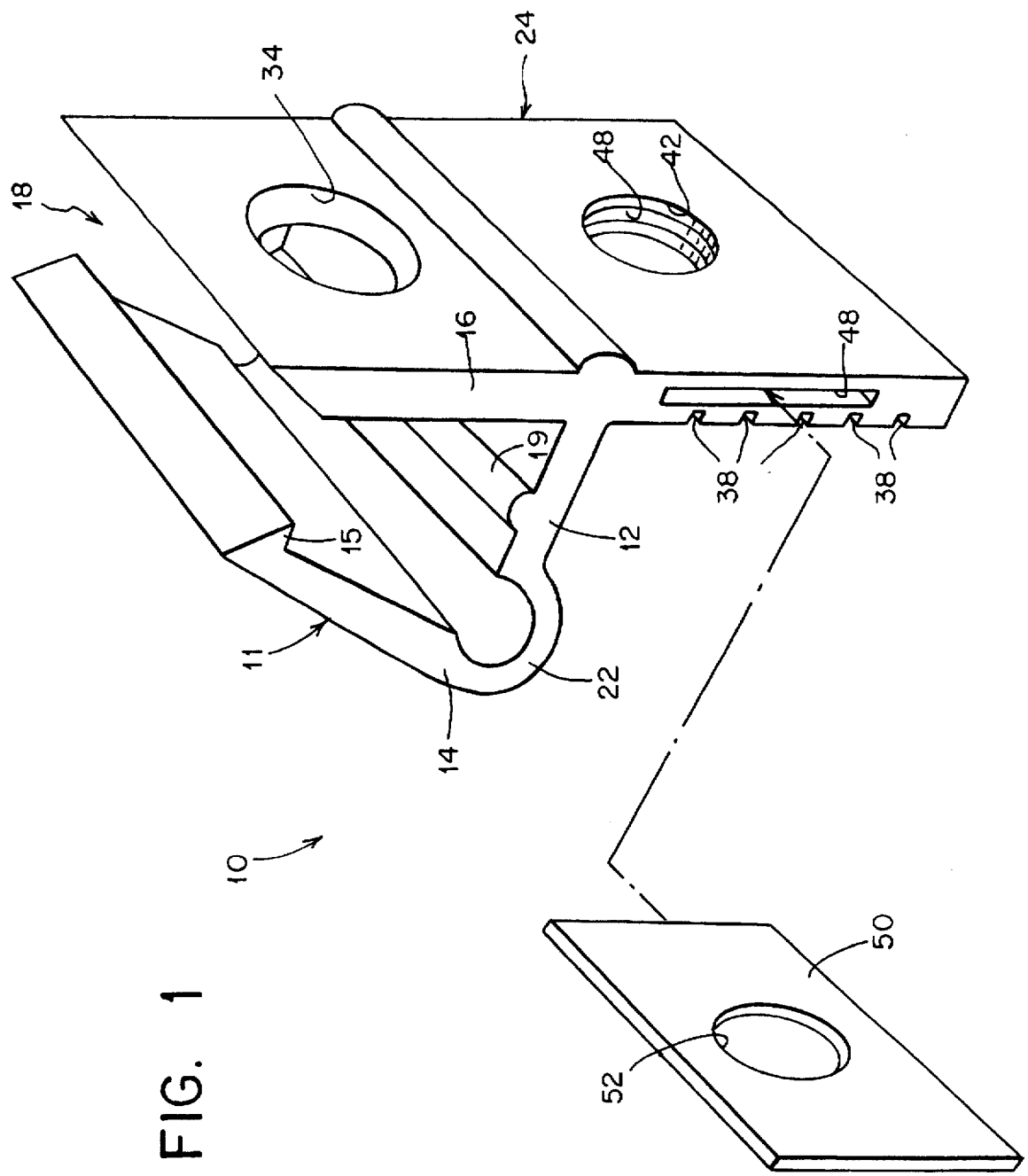

FRANGIBLE VEHICLE WINDOW PANEL MOUNTING BRACKET

BACKGROUND OF THE INVENTION

1. Field of the Invention

The present invention relates to a frangible window panel mounting bracket for mounting an automotive window panel onto a window regulating mechanism. More particularly, the invention relates to a mounting bracket having a U-shaped spring clip for supporting the window panel and a frangible mounting flange for attaching the window panel to the window regulating mechanism. The mounting flange is frangible so as to allow the spring clip to detach from a window regulating mechanism upon a side impact of the vehicle and thereby minimize the likelihood of a shattering of the window panel.

2. Description of the Prior Art

Brackets for securing window panels to a window regulating mechanism for raising and lowering the window panel are well-known in the art. Typically, mounting brackets are employed to rigidly and securely clamp the window panel to the window regulating mechanism. (See, e.g., U.S. Pat. No. 4,987,699, the subject matter of which is incorporated herein by reference thereto). While quite satisfactory in normal use, these brackets may possibly cause the window to shatter upon a side impact to the door of the vehicle. In such cases, it is typical for the crushed-in portions of the door body panel to strike the normally vertically extending window regulating mechanism, causing the same to bend. The bending of the window regulating mechanism may cause the window panel to shatter or to strike the door body panel which, in turn, causes it to shatter. So far as is known, there is no presently available bracket and/or window regulating mechanism which is designed to minimize the likelihood of the shattering of the window panel.

SUMMARY OF THE INVENTION

It is therefore an object of the present invention to provide a frangible window panel mounting bracket for mounting an automotive window panel onto a window regulating mechanism which is readily frangible so as to allow the window panel to detach from the window regulating mechanism upon a side impact to the vehicle, thereby minimizing the likelihood of the window panel shattering.

It is yet another object of the invention to provide such a frangible window panel mounting bracket which is simple in design, economical to manufacture and easy to install.

Certain of the foregoing and related objects are attained according to the invention by the provision of a frangible window panel mounting bracket for mounting an automotive window panel onto a window regulating mechanism for raising and lowering the window panel of a vehicle. The mounting bracket includes a generally U-shaped spring clip comprising a horizontal base member, and first and second leg members extending upwardly from the horizontal base member and being spaced apart to form a generally U-shaped channel with the horizontal base member for receiving a bottom edge of a window panel. The first leg member is preferably resiliently biased toward the second leg member so as to frictionally engage and support the bottom edge of a window panel inserted and received within the U-shaped channel. The mounting bracket also includes a mounting flange for detachably securing the spring clip to a window regulating mechanism of a vehicle. The mounting flange is downwardly depending from, and coupled to, the horizontal base member of the spring clip. The mounting flange is frangible so as to allow the spring clip to become detached from the window regulating mechanism to thereby minimize the likelihood of the window panel shattering upon a side impact to the vehicle.

Preferably, the horizontal base member has a detent for positioning the bottom edge of a window panel in a position spaced generally above the base member. It is desirable that the mounting bracket is manufactured from plastic.

Preferably, the second leg member has at least one opening formed therein for receiving a curable adhesive applied between the bottom edge of the window panel and the spring clip to adhesively hold the window panel in the generally U-shaped channel. The curable adhesive is applied to thereby form a supplemental mechanical interlock with the spring clip upon curing of the adhesive.

Most advantageously, the first leg of the U-shaped clip is joined to the horizontal base member via a rounded corner section of reduced width to increase the flexibility of the first leg. Most desirably, the first leg has a free end with an inwardly directed and tapered flange. The mounting flange preferably has an outer surface having at least one line of weakening (and preferably more) formed therein to facilitate separation of the mounting flange from the U-shaped clip upon a side impact to the vehicle.

In a preferred embodiment of the invention, the mounting flange has at least one bolt hole formed therethrough for securing the flange and, in turn, the spring clip to an arm of a window regulating mechanism via a bolt insertable therethrough. Most desirably, the mounting flange has an axial slot formed generally adjacently to the lines of weakening and an elongated retainer received within the slot. The retainer has a bolt hole formed therethrough alignable with the bolt hole in the mounting flange for securing the flange and, in turn, the spring clip to a window regulating mechanism via a bolt insertable therethrough.

BRIEF DESCRIPTION OF THE DRAWINGS

These and other objects and advantages of the present invention will become apparent from the following description of the accompanying drawings, which disclose one embodiment of the present invention. It is to be understood that the drawings are to be used for purposes of illustrations only, and not as a definition of the invention.

In the drawings, wherein similar reference numerals denote similar elements throughout the several views:

FIG. 1 is an exploded top, side and end isometric view of a frangible window panel bracket embodying the present invention;

DETAILED DESCRIPTION OF THE PREFERRED EMBODIMENT

Figure 3:
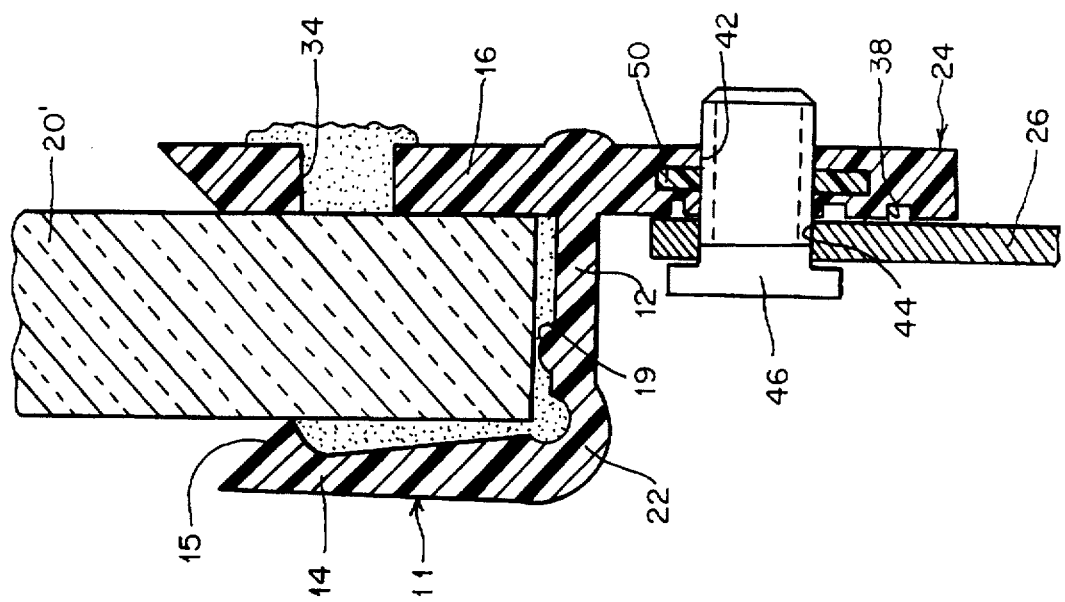
FIG. 3 is a cross-sectional view, comparable to that of FIG. 2, showing a relatively thick window panel being supported by the bracket which is connected to a window regulating mechanism by means of a bolt connection.

Referring now in detail to the drawings and, in particular, FIG. 1 thereof, therein illustrated is a novel, frangible window panel mounting bracket embodying the present invention, generally designated by reference numeral 10, which includes a generally U-shaped spring clip 11 and a mounting flange 24. Clip 11 has a generally horizontally-disposed base member 12 from the opposite ends of which upwardly extend a pair of leg members 14, 16 which cooperatively define therebetween a generally U-shaped channel 18 for the receipt of the lower edge of a window panel 20 (as shown in FIGS. 2–4).

Mounting flange 24 downwardly depends from, and is coupled to horizontally-disposed base member 12. Mounting flange 24 preferably has a plurality of notches 38 formed in the outer surface 40 thereof. The notches 38 of the mounting flange 24 allow easy rupture or separation of flange 24 from U-shaped clip 11, as described in greater detail hereinafter. In addition, mounting flange 24 has an axial slot 48 formed therethrough, for receiving a flat rectangular retainer 50 having a bolt hole 52 for receiving and supporting a bolt 46 (not shown).

Figure 2:
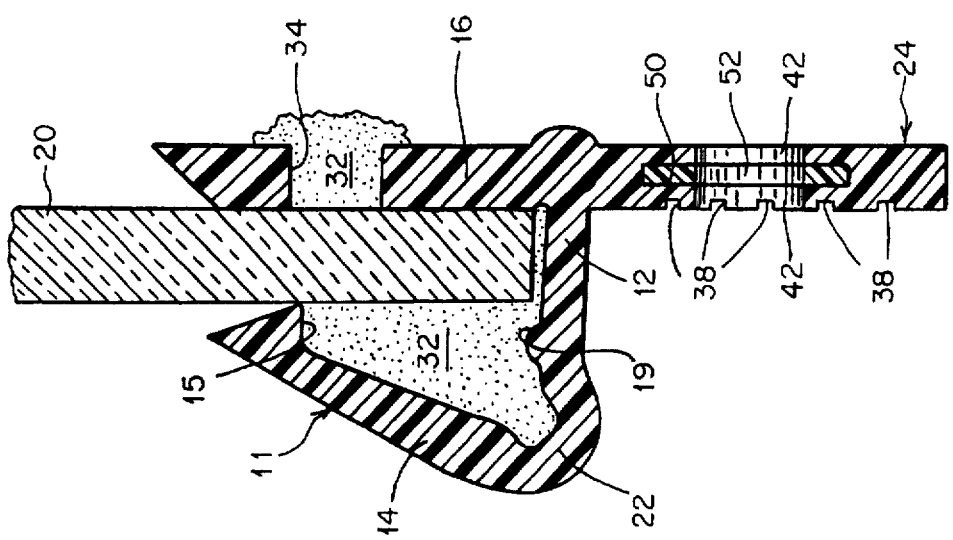
FIG. 2 is a cross-sectional view of the frangible window panel mounting bracket shown in FIG. 1, further showing a relatively thin window panel being supported by the bracket after application and curing of an adhesive.
Figure 4:
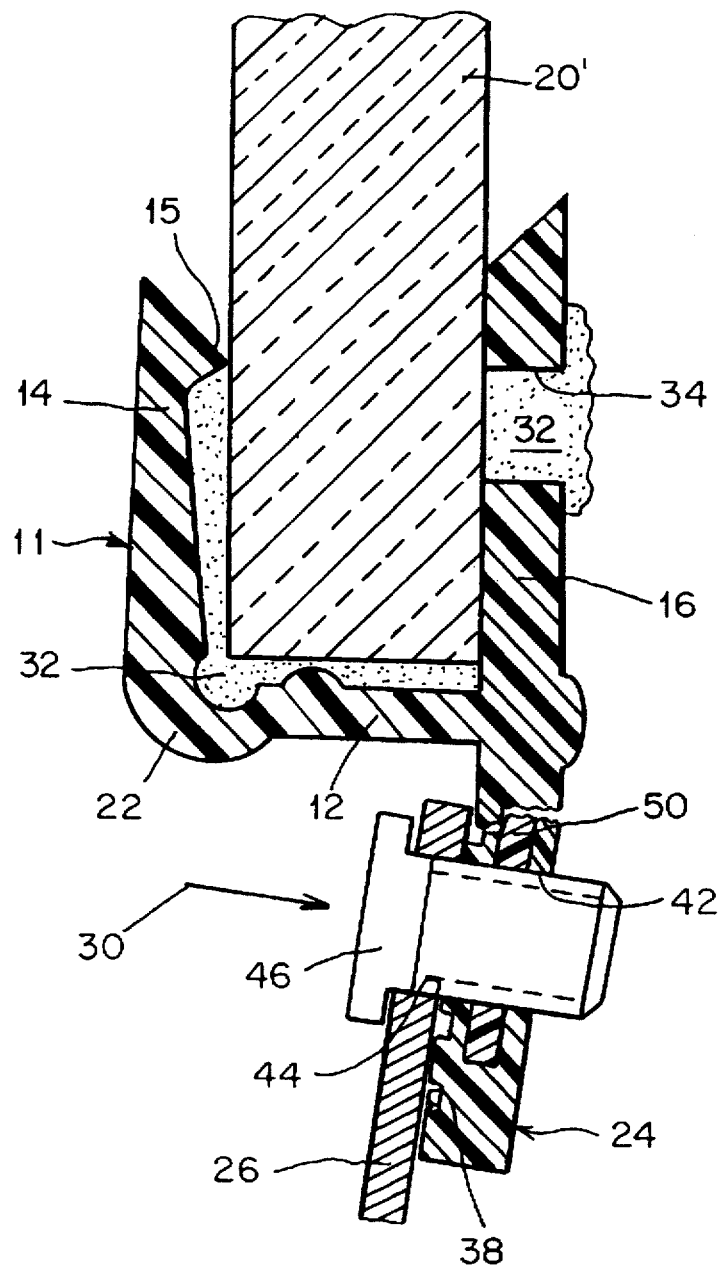
FIG. 4 is a cross-sectional view, comparable to that of FIG. 3, but schematically illustrating a force exerted to the side of the vehicle upon a collision which, in turn, causes the breaking off of the mounting flange of the window panel mounting bracket.

As seen best in FIGS. 2 and 3, leg 14 is resiliently biased towards leg 16 to provide for a frictional retention of a window panel edge 20 when inserted in channel 18. The frictional engagement of window panel edge 20 eliminates the need for other fasteners to initially retain the spring clip 11 to the window panel edge 20. Preferably, the normal bias of leg 14 towards leg 16 is effectuated by forming bracket 10 from a resilient plastic and/or joining leg 14 to horizontally-disposed base member 12 via a rounded corner 22 of reduced thickness or cross-section. The resilient quality of spring clip 11 and leg 14 allows bracket 10 to be used and adapted for a large range of thicknesses of auto windows which often vary from one vehicle type to the next and form relatively thin glass panels 20 (FIG. 2) to relatively thick glass panels 20' (FIGS. 3 and 4).

As shown in FIG. 2, prior to, during or after insertion of the edge of the window panel 20 into the generally U-shaped channel 18, a curable adhesive 32 is applied to channel 18 so that it flows around the edge of the window panel 20 and preferably through at least one opening 34 in leg 16. Upon curing of this conventional adhesive 32 (such as polyurethane), a mechanical interlock is formed between the cured adhesive 32 and the spring clip 11 to enhance the hold of window panel 20 within the U-shaped channel 18 thereof. Base member 12 is provided with a detent 19 for positioning the bottom edge of window panel 20 above base member 12 to assist in allowing the adhesive to flow underneath the bottom edge of panel 20. The free end of leg 14 is preferably provided with an inwardly directed and tapered flange-like tip 15 which abuts panel 20 and serves to retain adhesive 32 with channel 18.

As seen best in FIG. 3, mounting flange 24 is attached to a conventional window regulating mechanism 26. The mounting flange 24 has a bolt hole 42 formed therethrough which is aligned with bolt hole 52 of retainer 50 and a similar bolt hole 44 in window regulating mechanism 26 for interconnecting flange 24, retainer 50 and mechanism 26 together via a bolt 46 inserted through bolt holes 42, 44 and 52. The bolt 46 serves to hold the U-shaped spring clip 11 to the window regulating mechanism 26 by a locking means, such as a threaded locking nut (not shown), as is readily understood by those skilled in the art. The window regulating mechanism 26 is usually of the scissor-type construction, with movement of the scissor linkage (not shown) serving to raise and lower the window regulating mechanism 26 and, in turn, the window panel 20, as is readily understood by those skilled in the art (see, e.g., U.S. Pat. No. 4,776,132, the subject matter of which is incorporated herein by reference thereto).

Mounting flange 24 is frangible or rupturable, so that upon a side impact to the vehicle, spring clip 11 will be caused to detach or separate from mounting flange 24 and, in turn, the window regulating mechanism 26. By causing the spring clip 11 to detach or separate from the window regulating mechanism 26, it is less likely that the force generated by the side impact, designated by arrow 30 in FIG. 4, will be directly transferred from the window regulating mechanism 26 to the window panel 20, 20' via the spring clip 11. This serves to minimize the likelihood that the bending of the window regulating mechanism of the mounting flange 24 will cause the window panel 20, 20' to shatter, thereby increasing the safety of the vehicle in an automobile accident (reducing risk of the occupant or passersby being injured by the shattering glass or possibly being thrown from the vehicle).

The retainer 50 is made of a relatively strong and rigid plastic, such as that sold under the trademark "LEXAN", in comparison to the relatively resilient and more easily fractured or frangible material of the bracket proper 10. As a result, the relatively rigid retainer 50 in combination with the strong bolts 46 and the rigid window regulating arm 26 facilitate rupture of the mounting flange 26 sandwiched therebetween during a side impact.

As can be appreciated from the foregoing, the present invention provides a mounting bracket that overcomes numerous disadvantages of conventional mounting brackets employed to attach auto window panels to window regulating mechanisms. The present resilient bracket is universally applicable to all thicknesses of auto window panels now applied to all production vehicles. It does not require any additional fasteners or retainers to initially retain window panels of any thickness on the bracket. No additional quick setting adhesive is required to effect retention of the window to the interior channel of the mounting bracket, unlike many conventional assembly techniques. Moreover, the mechanical interlock achieved between the adhesive and the hole in the leg of the U-shaped spring clip solves the problem of loss of adhesive retention resulting in detachment of the glass from the mounting bracket in conventional systems.

Thus, while only one embodiment of the present invention has been illustrated and described, it is obvious that many changes and modifications may be made thereunto, without departing from the spirit and scope of the invention.

What is claimed is:

1. A frangible window panel mounting bracket for mounting a vehicle window panel onto a window regulating mechanism of a vehicle, said bracket comprising:

a generally U-shaped spring clip comprising a horizontal base member, and a first leg member and a second leg member extending upwardly from said horizontal base member and being spaced apart to form a generally U-shaped channel with said horizontal base member for receiving a bottom edge of the window panel; and a mounting flange for detachably securing said spring clip to the window regulating mechanism of the vehicle, said mounting flange being downwardly depending from, and coupled to, said horizontal base member of said spring clip, said mounting flange having a plurality of spaced-apart lines of weakening dimensioned and configured so that said mounting flange is frangible to allow said spring clip to become detachable from the window regulating mechanism to thereby minimize the window panel shattering upon a side impact to the vehicle.

2. A frangible window panel mounting bracket as set forth in claim 1, wherein said first leg member is resiliently biased toward said second leg member for frictionally engaging and supporting the bottom edge of the window panel inserted and received within said generally U-shaped channel.

3. A frangible window panel mounting bracket as set forth in claim 1, wherein said second leg member has at least one opening therein for receiving a curable adhesive applied to adhesively hold the window panel in said generally U-shaped channel to thereby form a supplemental mechanical interlock with the spring clip upon curing.

4. A frangible window panel mounting bracket as set forth in claim 3, wherein said horizontal base member has a detent for positioning said bottom edge of the window panel in a position spaced generally above said base member.

5. A frangible window panel mounting bracket as set forth in claim 1, wherein said mounting flange has at least one bolt hole formed therethrough for securing said mounting flange and, in turn, said spring clip to the window regulating mechanism via a bolt insertable therethrough.

6. A frangible window panel mounting bracket as set forth in claim 5, wherein said mounting flange has an axial slot formed generally adjacently to said lines of weakening and an elongated retainer received within said slot, said retainer having a bolt hole formed therethrough aligned with said bolt hole of said mounting flange for securing said mounting flange, said retainer and, in turn, said spring clip to the window regulating mechanism via a bolt insertable through said bolt holes.

7. A frangible window panel mounting bracket as set forth in claim 1, wherein said bracket is manufactured from plastic.

8. A frangible window panel mounting bracket as set forth in claim 1, wherein said first leg is joined to said horizontal base member via a rounded corner section of reduced width to increase the flexibility of said first leg.

9. A frangible window panel mounting bracket as set forth in claim 1, wherein said first leg has a free end with an inwardly directed and tapered flange.

10. A frangible window panel mounting bracket for mounting a vehicle window panel onto a window regulating mechanism of a vehicle, said bracket comprising
- a generally U-shaped spring clip comprising a horizontal base member, and a first leg member and a second leg member extending upwardly from said horizontal base member and being spaced apart to form a generally U-shaped channel with said horizontal base member for receiving a bottom edge of a window panel, said horizontal base member having a detent for positioning the bottom edge of the window panel in a position spaced generally above said base member;
- a mounting flange for securing said spring clip to a window regulating mechanism of a vehicle, said mounting flange being downwardly depending from, and coupled to, said horizontal base member of said spring clip, said mounting flange having a plurality of spaced-apart lines of weakening dimensioned and configured so that said mounting flange is frangible to allow said spring clip to become detachable from the window regulating mechanism to thereby minimize the window panel shattering upon a side impact to the vehicle.

11. A window panel mounting bracket for mounting a vehicle window panel onto a window regulating mechanism, said bracket comprising:
- a generally U-shaped spring clip comprising a horizontal base member, and a first leg member and a second leg member extending upwardly from said horizontal base member and being spaced apart to form a generally U-shaped channel with said horizontal base member for receiving a bottom edge of a window panel, said first leg joined to said horizontal base member via rounded corner section of reduced width to increase the flexibility of said first leg; and
- a mounting flange for securing said spring clip to a window regulating mechanism of a vehicle, said mounting flange being downwardly depending from, and coupled to, said horizontal base member of said spring clip.

12. A bracket according to claim 11, wherein said mounting flange is frangible so as to allow said spring clip to become detachable from the window regulating mechanism to thereby minimize the window panel shattering upon a side impact to the vehicle.

13. A window panel mounting bracket for mounting a vehicle window panel onto a window regulating mechanism of a vehicle, said bracket comprising:
- a generally U-shaped spring clip comprising a horizontal base member, and a first leg member and a second leg member extending upwardly from said horizontal base member and being spaced apart to form a generally U-shaped channel with said horizontal base member for receiving a bottom edge of a window panel, said first leg having a free end with an inwardly directed and tapered flange; and
- a mounting flange for detachably securing said spring clip to a window regulating mechanism of a vehicle, said mounting flange being downwardly depending from, and coupled to, said horizontal base member of said spring clip.

14. A bracket according to claim 13, wherein said mounting flange is frangible so as to allow said spring clip to become detachable from the window regulating mechanism to thereby minimize the window panel shattering upon side impact to the vehicle.

15. A frangible window panel mounting bracket for mounting a vehicle window panel onto a window regulating mechanism of a vehicle, said bracket comprising:
- a generally U-shaped spring clip comprising a horizontal base member, and a first leg member and a second leg member extending upwardly from said horizontal base member and being spaced apart to form a generally U-shaped channel with said horizontal base member for receiving a bottom edge of the window panel; and
- a mounting flange for detachably securing said spring clip to the window regulating mechanism of the vehicle, said mounting flange having a width less than a width of said U-shaped spring clip and having a plurality of spaced-apart lines of weakening dimensioned and configured so that said mounting flange is frangible to allow said spring clip to become detachable from the window regulating mechanism to thereby minimize the window panel shattering upon a side impact to the vehicle.

16. A window assembly for a vehicle comprising:
- a window pane;
- a window regulating mechanism;
- a generally U-shaped spring clip comprising a horizontal base member, and a first leg member and a second leg member extending upwardly from said horizontal base member and being spaced apart to form a generally U-shaped channel with said horizontal base member for receiving a bottom edge of said window panel; and
- a mounting flange for detachably securing said spring clip to said window mechanism, said mounting flange being downwardly depending from, and coupled to, said horizontal base member of said spring clip, said mounting flange having a plurality of spaced-apart lines a line of weakening dimensioned and configured so that said mounting flange is frangible to allow said spring clip to become detachable from said window regulating mechanism to thereby minimize said window panel shattering upon a side impact to the vehicle.

17. A frangible window panel mounting bracket for mounting a vehicle window panel onto a window regulating mechanism said bracket comprising:

a generally U-shaped spring clip comprising a horizontal base member, and a first leg member and a second leg member extending upwardly from said horizontal base member and being spaced apart to form a generally U-shaped channel with said horizontal base member for receiving a bottom edge of the window panel; and a mounting flange for detachably securing said spring clip to the window regulating mechanism of the vehicle, said mounting flange being downwardly depending from, and coupled to, said horizontal base member of said spring clip, said mounting flange having at least one line of weakening dimensioned and configured so that said mounting flange is frangible to allow said spring clip to become detachable from the window regulating mechanism to thereby minimize the window panel shattering upon a side impact to the vehicle, and wherein said mounting flange has at least one bolt hole formed therethrough for securing said mounting flange and, in turn, said spring clip to the window regulating mechanism via a bolt insertable therethrough.

* * * * *